United States Patent
Sasagawa

(10) Patent No.: US 12,269,199 B2
(45) Date of Patent: Apr. 8, 2025

(54) INSPECTION METHOD FOR INJECTION MOLDING DEVICE, TEST MOLD, AND INSPECTION SYSTEM

(71) Applicant: SEIKO EPSON CORPORATION, Tokyo (JP)

(72) Inventor: Kakeru Sasagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 17/248,294

(22) Filed: Jan. 19, 2021

(65) Prior Publication Data

US 2021/0221041 A1 Jul. 22, 2021

(30) Foreign Application Priority Data

Jan. 22, 2020 (JP) .................................. 2020-008302

(51) Int. Cl.
*B29C 45/80* (2006.01)
*B29C 45/77* (2006.01)
*B29C 45/78* (2006.01)

(52) U.S. Cl.
CPC .............. *B29C 45/80* (2013.01); *B29C 45/77* (2013.01); *B29C 45/78* (2013.01);
(Continued)

(58) Field of Classification Search
CPC ......... B29C 45/13; B29C 45/77; B29C 45/80; B29C 45/78; B29C 2945/76381;
(Continued)

(56) References Cited

U.S. PATENT DOCUMENTS 2,293,304 A * 8/1942 Muller .................... B29C 45/03
91/441
8,280,544 B2 * 10/2012 Catoen .................... B29C 45/76
340/8.1
(Continued)

FOREIGN PATENT DOCUMENTS

JP S5939531 A 3/1984
JP 2010241016 A 10/2010
(Continued)

OTHER PUBLICATIONS

Office Action for CN Patent Application No. CN202110070245.1, issued on Aug. 22, 2022, 11 pages of Office Action.
(Continued)

*Primary Examiner* — Monica A Huson
(74) *Attorney, Agent, or Firm* — CHIP LAW GROUP

(57) ABSTRACT

An inspection method for an injection molding device includes: a first step of acquiring a first detection value from a sensor using a test mold having the sensor, the sensor measuring a temperature or pressure of a molten material injected from a first injection molding device into a cavity section demarcated by a fixed mold and a moving mold; a second step of injecting a molten material from a second injection molding device into the cavity section and acquiring a second detection value from the sensor; and a third step of performing an inspection using the first detection value and the second detection value.

8 Claims, 10 Drawing Sheets

(52) U.S. Cl.
CPC ............... *B29C 2945/76006* (2013.01); *B29C 2945/7604* (2013.01); *B29C 2945/76083* (2013.01); *B29C 2945/7618* (2013.01); *B29C 2945/76257* (2013.01); *B29C 2945/76381* (2013.01); *B29C 2945/76498* (2013.01); *B29C 2945/76568* (2013.01); *B29C 2945/76949* (2013.01)

(58) Field of Classification Search
CPC ........... B29C 2945/76083; B29C 2945/76006; B29C 2945/76568; B29C 2945/76498; B29C 2945/76257; B29C 2945/7604; B29C 2945/76949; B29C 2945/7618
See application file for complete search history.

(56) References Cited

U.S. PATENT DOCUMENTS

| | | | | |
|---|---|---|---|---|
| 2007/0294040 | A1* | 12/2007 | Galt | B22D 46/00 702/33 |
| 2008/0305201 | A1* | 12/2008 | Maruyama | B29C 45/76 425/170 |
| 2016/0193761 | A1 | 7/2016 | Uchiyama | |
| 2017/0028593 | A1 | 2/2017 | Maruyama et al. | |
| 2018/0297258 | A1* | 10/2018 | Zhu | B29C 45/78 |

FOREIGN PATENT DOCUMENTS

| | | |
|---|---|---|
| JP | 2012035434 A | 2/2012 |
| JP | 2012131115 A | 7/2012 |
| JP | 2012206338 A | 10/2012 |
| JP | 2016124249 A | 7/2016 |
| JP | 2017030221 B | 2/2018 |
| JP | 2018094764 A | 6/2018 |
| JP | 2019059083 A | 4/2019 |
| WO | 2011149243 A2 | 12/2011 |

OTHER PUBLICATIONS

Office Action for JP Patent Application No. JP2020008302, issued on Nov. 7, 2023, 7 pages of Office Action.
Office Action for JP Patent Application No. JP2020008302, issued on Jan. 24, 2024.

\* cited by examiner

INSPECTION METHOD FOR INJECTION MOLDING DEVICE, TEST MOLD, AND INSPECTION SYSTEM

The present application is based on, and claims priority from JP Application Serial Number 2020-008302, filed Jan. 22, 2020, the disclosure of which is hereby incorporated by reference herein in its entirety.

BACKGROUND

1. Technical Field

The present disclosure relates to an inspection method for an injection molding device, a test mold, and an inspection system.

2. Related Art

JP-A-2010-241016 discloses an injection molding device which plasticizes a material with a rotor having a spiral groove formed on an end surface and a barrel coming into contact with the end surface of the rotor.

An injection molding device may change in state or may have an abnormality due to its use over a long period of time. Also, injection molding devices having an identical configuration may produce molded products of various qualities. Thus, a technique that can accurately inspect an injection molding device is demanded.

SUMMARY

According to a first aspect of the disclosure, an inspection method for an injection molding device is provided. The inspection method includes: a first step of acquiring a first detection value from a sensor using a test mold having the sensor, the sensor measuring a temperature or pressure of a molten material injected from a first injection molding device into a cavity section demarcated by a fixed mold and a moving mold; a second step of injecting a molten material from a second injection molding device into the cavity section and acquiring a second detection value from the sensor; and a third step of performing an inspection using the first detection value and the second detection value.

According to a second aspect of the disclosure, a test mold installed in an injection molding device is provided. The test mold includes: a fixed mold; a moving mold; a cavity section demarcated by the fixed mold and the moving mold; and a sensor measuring a temperature or pressure of a molten material injected from the injection molding device into the cavity section.

According to a third aspect of the disclosure, an inspection system for an injection molding device is provided. The inspection system includes: a test mold having a fixed mold, a moving mold, a cavity section demarcated by the fixed mold and the moving mold, and a sensor measuring a temperature or pressure of a molten material injected from the injection molding device into the cavity section, the test mold being installed in the injection molding device; a terminal device having an acquisition unit that acquires a detection value from the sensor and a transmission unit that transmits the detection value; and a server having a receiving unit that receives the detection value transmitted from the transmission unit, an inspection unit that performs an inspection of the injection molding device using the detection value, and an output unit that outputs a result of the inspection.

DESCRIPTION OF EXEMPLARY EMBODIMENTS

A. First Embodiment

Figure 1:
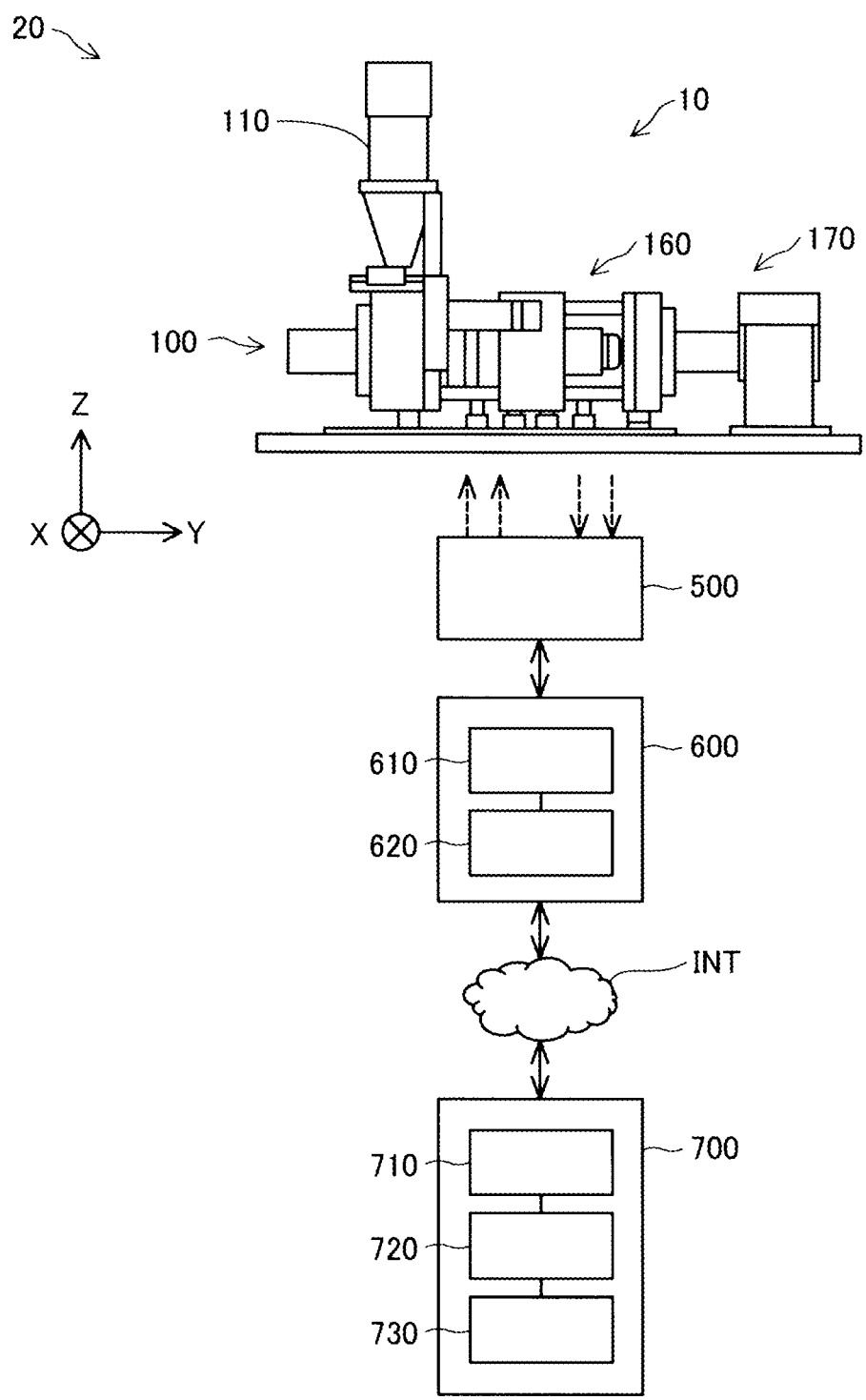
FIG. 1 shows a schematic configuration of an inspection system.

FIG. 1 shows a schematic configuration of an inspection system 20 according to this embodiment. The inspection system 20 is a system inspecting an injection molding device 10. The injection molding device 10 has a plasticizing unit 100 plasticizing a material, a material supply unit 110 supplying a material to the plasticizing unit 100, and a mold clamping device 170 for opening and closing a mold installed in the injection molding device 10. The injection molding device 10 is controlled by a control device 500. The control device 500 is formed, for example, of a programmable logic controller. The injection molding device 10 in this embodiment is equivalent to both a "first injection molding device" and a "second injection molding device".

The inspection system 20 has a test mold 160, a terminal device 600, and a server 700. The test mold 160 is a mold used for an inspection of the injection molding device 10 and is removably installed in the injection molding device 10. When the injection molding device 10 performs mass production or trial production of a molded product, a shaping mold, instead of the test mold 160, is installed in the injection molding device 10. The test mold 160, which will be described in detail later, is provided with a sensor measuring a temperature or pressure of a molten material injected from the injection molding device 10 into the test mold 160.

The terminal device 600 is formed of a computer having a CPU and a memory. The terminal device 600 is used, for example, by a worker maintaining the injection molding device 10. The terminal device 600 has an acquisition unit 610 acquiring a detection value from the sensor provided in the test mold 160, and a transmission unit 620 transmitting the detection value to the server 700 via wireless communication or wired communication. The acquisition unit 610 acquires a detection value from the sensor via the control device 500.

The server 700 is formed of a computer having a CPU and a memory. The server 700 is configured to be able to communicate with the terminal device 600. The server 700 is coupled to the terminal device 600, for example, via the internet INT. The server 700 can also be referred to as a cloud server. The server 700 has a receiving unit 710 receiving a detection value transmitted from the transmission unit 620 of the terminal device 600, an inspection unit 720 performing an inspection of the injection molding device 10 using the detection value, and an output unit 730 outputting the result of the inspection. The content of processing executed by the inspection system 20 will be described later.

In FIG. 1, arrows along X, Y, and Z-directions orthogonal to each other are illustrated. The X, Y, and Z-directions are directions along an X-axis, Y-axis, and Z-axis, respectively, that are three spatial axes orthogonal to each other. The X, Y, and Z-directions include both one direction along the X-axis, Y-axis, and Z-axis, respectively, and the opposite direction. The X-axis and Y-axis are axes along a horizontal plane. The Z-axis is an axis along a vertical line. In the other illustrations, too, arrows along the X, Y, and Z-directions are shown according to need. The X, Y, and Z-directions in FIG. 1 and the X, Y, and Z-directions in the other illustrations represent the same directions.

Figure 2:
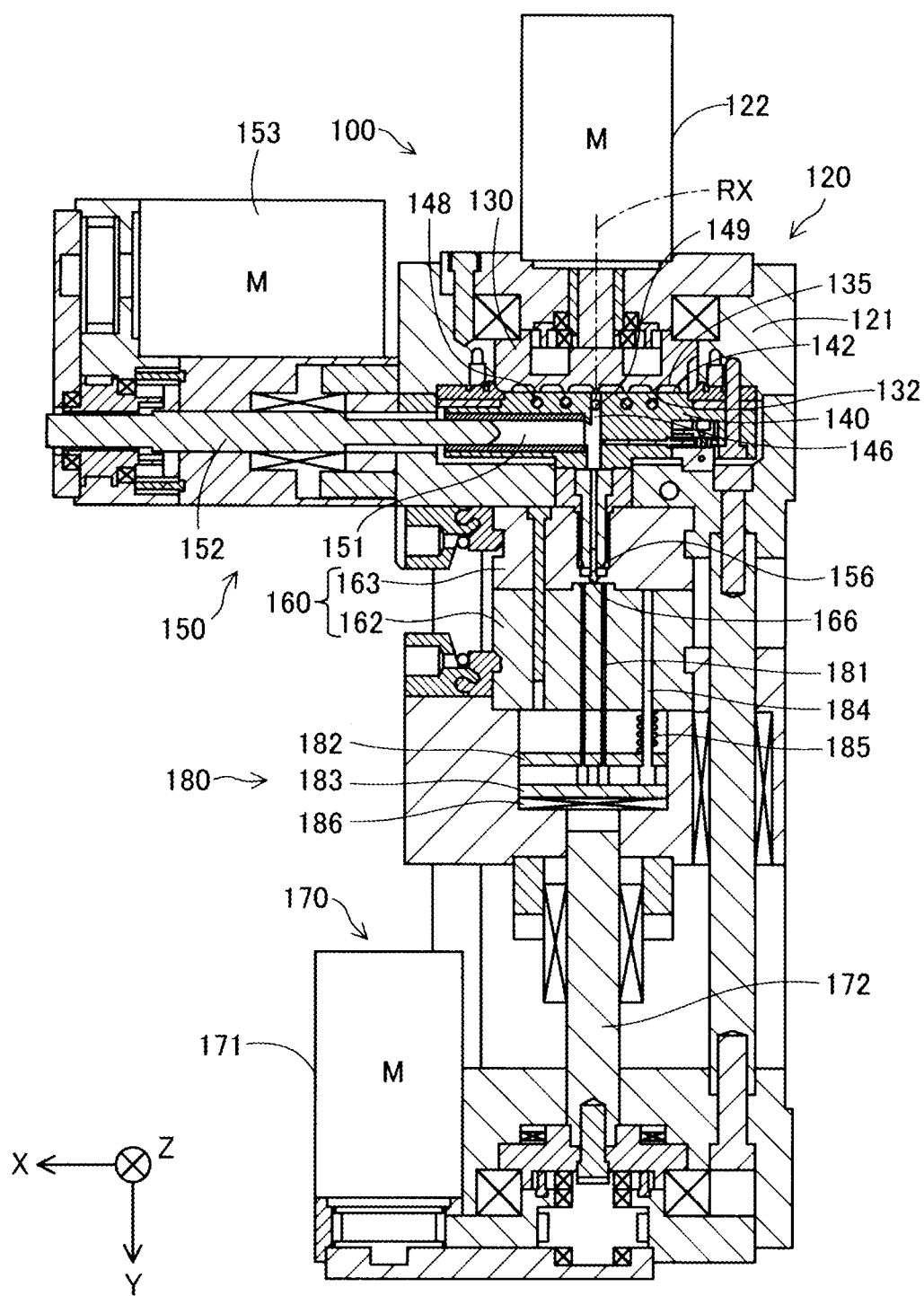
FIG. 2 is a cross-sectional view showing a schematic configuration of an injection molding device.

FIG. 2 is a cross-sectional view showing a schematic configuration of the injection molding device 10. FIG. 2 shows a cross section of the injection molding device 10 as viewed from below in FIG. 1, that is, as viewed from the −Z-direction. As described above, the injection molding device 10 has the plasticizing unit 100 and the mold clamping device 170, and the test mold 160 is installed in the injection molding device 10. FIG. 2 shows a schematic configuration of the test mold 160. A detailed configuration of the test mold 160 will be described later.

The plasticizing unit 100 has a melting unit 120, an injection control unit 150, and an injection nozzle 156.

The melting unit 120 communicates with the material supply unit 110 shown in FIG. 1. The melting unit 120 is supplied with a material from the material supply unit 110. In this embodiment, the material supply unit 110 is formed of a hopper. The material supply unit 110 accommodates the material in the form of pellets, powder or the like. In this embodiment, an ABS resin in the form of pellets is stored as the material in the material supply unit 110.

The melting unit 120 has a case 121, a drive motor 122, a rotor 130, a barrel 140, a heating unit 148, and a check valve 149. The melting unit 120 plasticizes at least a part of the material supplied from the material supply unit 110, thus generates a fluid paste-like plasticized material, and guides the plasticized material to the injection control unit 150. To "plasticize" means softening a thermoplastic material by heating to a temperature equal to or higher than the glass transition temperature, and thus causing the material to manifest fluidity. To "melt" means not only liquefying a thermoplastic material by heating to a temperature equal to or higher than the melting point but also plasticizing the thermoplastic material. The rotor 130 in this embodiment may also be referred to as a "flat screw" or "scroll".

The rotor 130 is substantially in the shape of a circular column having a height in a direction along its central axis RX that is smaller than the diameter. The rotor 130 is accommodated in a space surrounded by the case 121 and the barrel 140. The rotor 130 has a groove-formed surface 132 provided with a groove part 135, at an end surface facing the barrel 140. The groove-formed surface 132 of the rotor 130 faces a facing surface 142 of the barrel 140. The drive motor 122 is coupled to a surface opposite to the groove-formed surface 132, of the rotor 130. The rotor 130 rotates about the central axis RX in response to a torque generated by the drive motor 122. The drive motor 122 is driven under the control of the control device 500. The central axis RX may also be referred to as the rotation axis of the rotor 130.

Figure 3:
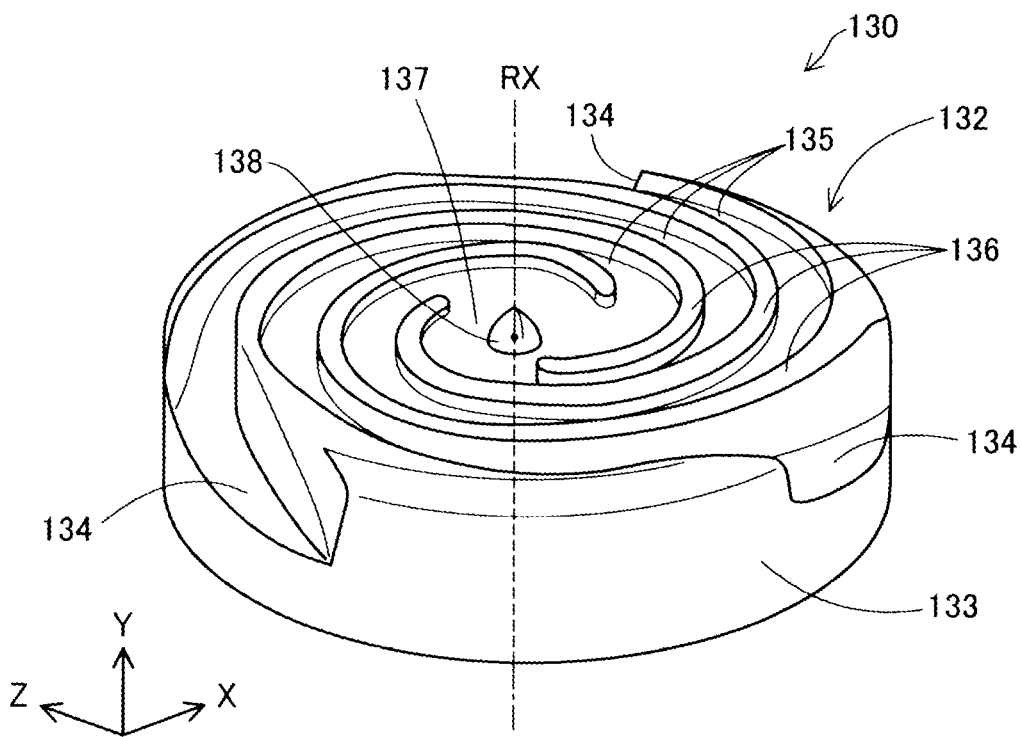
FIG. 3 is a perspective view showing a configuration of a rotor.

FIG. 3 is a perspective view showing the configuration on the groove-formed surface 132 side of the rotor 130. In FIG. 3, the position of the central axis RX of the rotor 130 is indicated by a chain-dotted line. As described above, the groove part 135 is provided on the groove-formed surface 132.

The groove part 135 on the rotor 130 forms a so-called scroll groove. The groove part 135 extends in a swirl-like shape forming an arc toward the outer circumference of the rotor 130 from a center part 137. The groove part 135 may be configured to extend in the shape of an involute curve or a spiral. On the groove-formed surface 132, a protruding part 136 forming a sidewall part of the groove part 135 and extending along each groove part 135 is provided. The groove part 135 continues to a material inlet 134 provided on a lateral surface 133 of the rotor 130. The material inlet 134 is a part for accepting the material into the groove part 135. The material supplied from the material supply unit 110 is supplied in between the rotor 130 and the barrel 140 via the material inlet 134.

The center part 137 of the groove-formed surface 132 of the rotor 130 is formed as a recess having one end of the groove part 135 coupled thereto. As shown in FIG. 2, the center part 137 faces a communication hole 146 provided in the facing surface 142 of the barrel 140. The center part 137 intersects the central axis RX.

The rotor 130 in this embodiment has, at the center part 137, a stagnation control part 138 protruding toward the communication hole 146. In this embodiment, the stagnation control part 138 is substantially conical. The central axis of the stagnation control part 138 substantially coincides with the central axis RX of the rotor 130. The tip of the stagnation control part 138 is arranged further into the communication hole 146 than the opening end of the communication hole 146 in the facing surface 142. The stagnation control part 138 efficiently guides the plasticized material in the center part 137 into the communication hole 146 and therefore prevents stagnation of the plasticized material. The stagnation of the plasticized material may also be referred to as a "pool".

FIG. 3 shows an example of the rotor 130 having three groove parts 135 and three protruding parts 136. The number of groove parts 135 and protruding parts 136 provided in the rotor 130 is not limited to three. In the rotor 130, one groove part 135 may be provided, or a plurality of groove parts 135, that is, two or more groove parts 135 may be provided. Any number of protruding parts 136 corresponding to the number of groove parts 135 may be provided.

FIG. 3 illustrates an example of the rotor 130 having the material inlet 134 formed at three positions. The number of positions where the material inlet 134 is provided in the rotor 130 is not limited to three. In the rotor 130, the material inlet 134 may be provided at one position, or at a plurality of positions, that is, two or more positions.

Figure 4:
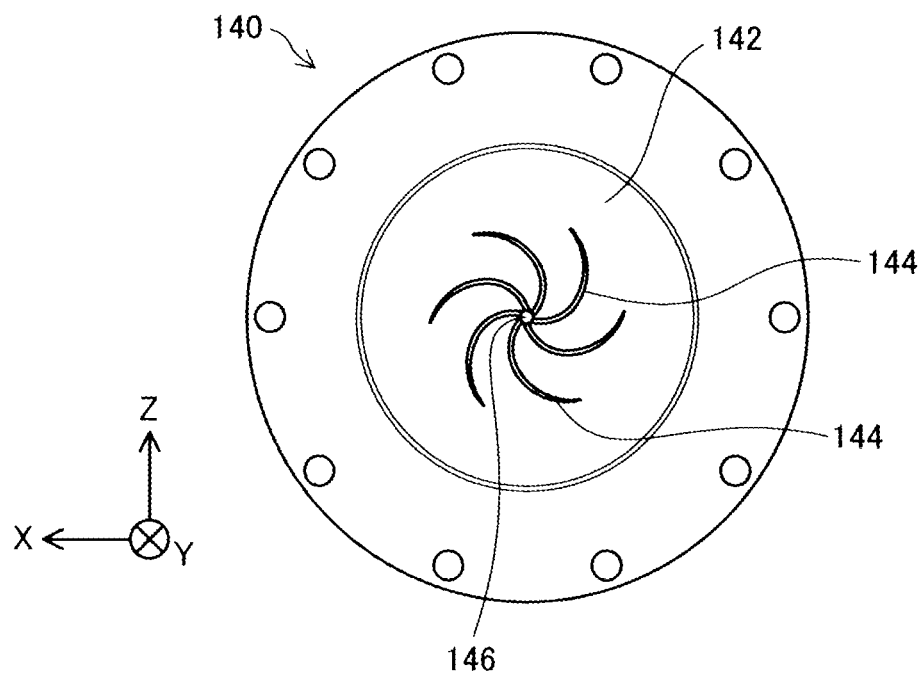
FIG. 4 is an explanatory view showing a configuration of a barrel.

FIG. 4 is an explanatory view showing the configuration of the facing surface 142 side of the barrel 140. As described above, the barrel 140 has the facing surface 142 facing the groove-formed surface 132 of the rotor 130. At the center of the facing surface 142, the communication hole 146 communicating with the injection nozzle 156 is provided.

Around the communication hole 146 in the facing surface 142, a plurality of guide grooves 144 are provided. The individual guide grooves 144 are coupled to the communication hole 146 at one end and extend in a swirl-like shape toward the outer circumference of the facing surface 142 from the communication hole 146. Each guide groove 144 has the function of guiding a shaping material to the communication hole 146. To efficiently make the shaping material reach the communication hole 146, the guide groove 144 may be formed on the barrel 140. However, the guide groove 144 may be not formed.

The heating unit 148 shown in FIG. 2 heats the melting unit 120. In this embodiment, the heating unit 148 is formed of four rod-like heaters provided inside the barrel 140. The heating unit 148 is controlled by the control device 500.

The check valve 149 is provided inside the communication hole 146. The check valve 149 restrains backflow of the plasticized material from the communication hole 146 to the center part 137 and the groove part 135 of the rotor 130.

The melting unit 120 heats the material supplied in between the rotor 130 and the barrel 140 while conveying the material toward the communication hole 146, using the rotor 130, the barrel 140, and the heating unit 148, thus generates a plasticized material, and causes the plasticized material to flow out from the communication hole 146 to the injection control unit 150.

The injection control unit 150 has a cylinder 151, a plunger 152, and a plunger drive unit 153. The cylinder 151 is a substantially cylindrical member coupled to the communication hole 146 in the barrel 140. The plunger 152 moves inside the cylinder 151. The plunger 152 is driven by the plunger drive unit 153 formed of a motor, a gear, and the like. The plunger drive unit 153 is controlled by the control device 500.

The injection control unit 150 under the control of the control device 500 causes the plunger 152 to slide inside the cylinder 151 and thus executes a measurement operation and an injection operation. The measurement operation refers to an operation of moving the plunger 152 in a direction away from the communication hole 146, thus guiding the plasticized material from inside the communication hole 146 into the cylinder 151, and measuring the amount of the material in the cylinder 151. The injection operation refers to an operation of moving the plunger 152 in a direction toward the communication hole 146 and thus injecting the plasticized material from inside the cylinder 151 into a shaping mold via the injection nozzle 156.

As described above, the injection nozzle 156 communicates with the communication hole 146. As the measurement operation and the injection operation are carried out, the plasticized material measured in the cylinder 151 is sent from the injection control unit 150 to the injection nozzle 156 via the communication hole 146 and is injected from the injection nozzle 156 into the test mold 160.

The plasticized material sent to the injection nozzle 156 is injected from the injection nozzle 156 into a cavity section 166 of the test mold 160. The test mold 160 has a moving mold 162 and a fixed mold 163 facing each other and has the cavity section 166 between the moving mold 162 and the fixed mold 163. The cavity section 166 is demarcated as a recessed and protruding shape formed by the moving mold 162 and the fixed mold 163. The cavity section 166 has a space corresponding to the shape of a molded product. In this embodiment, the moving mold 162 and the fixed mold 163 are formed of a metal material. The moving mold 162 and the fixed mold 163 may be formed of a ceramic material or a resin material.

The mold clamping device 170 has a mold drive unit 171 and a ball screw 172. The mold drive unit 171 is formed of a motor, a gear, and the like, and is coupled to the moving mold 162 via the ball screw 172. The driving of the mold drive unit 171 is controlled by the control device 500. The ball screw 172 transmits the power by the driving of the mold drive unit 171 to the moving mold 162. The mold clamping device 170 under the control of the control device 500 moves the moving mold 162 via the mold drive unit 171 and the ball screw 172 and thus opens and closes the test mold 160.

The moving mold 162 is provided with an extrusion mechanism 180 to release the molded product from a shaping mold 12. The extrusion mechanism 180 has an ejector pin 181, a support plate 182, a support rod 184, a spring 185, an extrusion plate 183, and a thrust bearing 186.

The ejector pin 181 is a rod-like member for extruding a molded product molded inside the cavity section 166. The ejector pin 181 is provided in such a way as to penetrate the moving mold 162 and reach the cavity section 166. The support plate 182 is a plate member supporting the ejector pin 181. The ejector pin 181 is fixed to the support plate 182. The support rod 184 is fixed to the support plate 182 and is inserted in a penetration hole formed in the moving mold 162. The spring 185 is arranged in the space between the moving mold 162 and the support plate 182. The support rod 184 is inserted in the spring 185. At the time of molding, the spring 185 energizes the support plate 182 in such a way that the head of the ejector pin 181 forms a part of the wall surface of the cavity section 166. The extrusion plate 183 is fixed to the support plate 182. The thrust bearing 186 is attached to the extrusion plate 183 and is provided in such a way that the head of the ball screw 172 does not damage the extrusion plate 183. Also, a thrust slide bearing or the like may be used instead of the thrust bearing 186.

Figure 5:
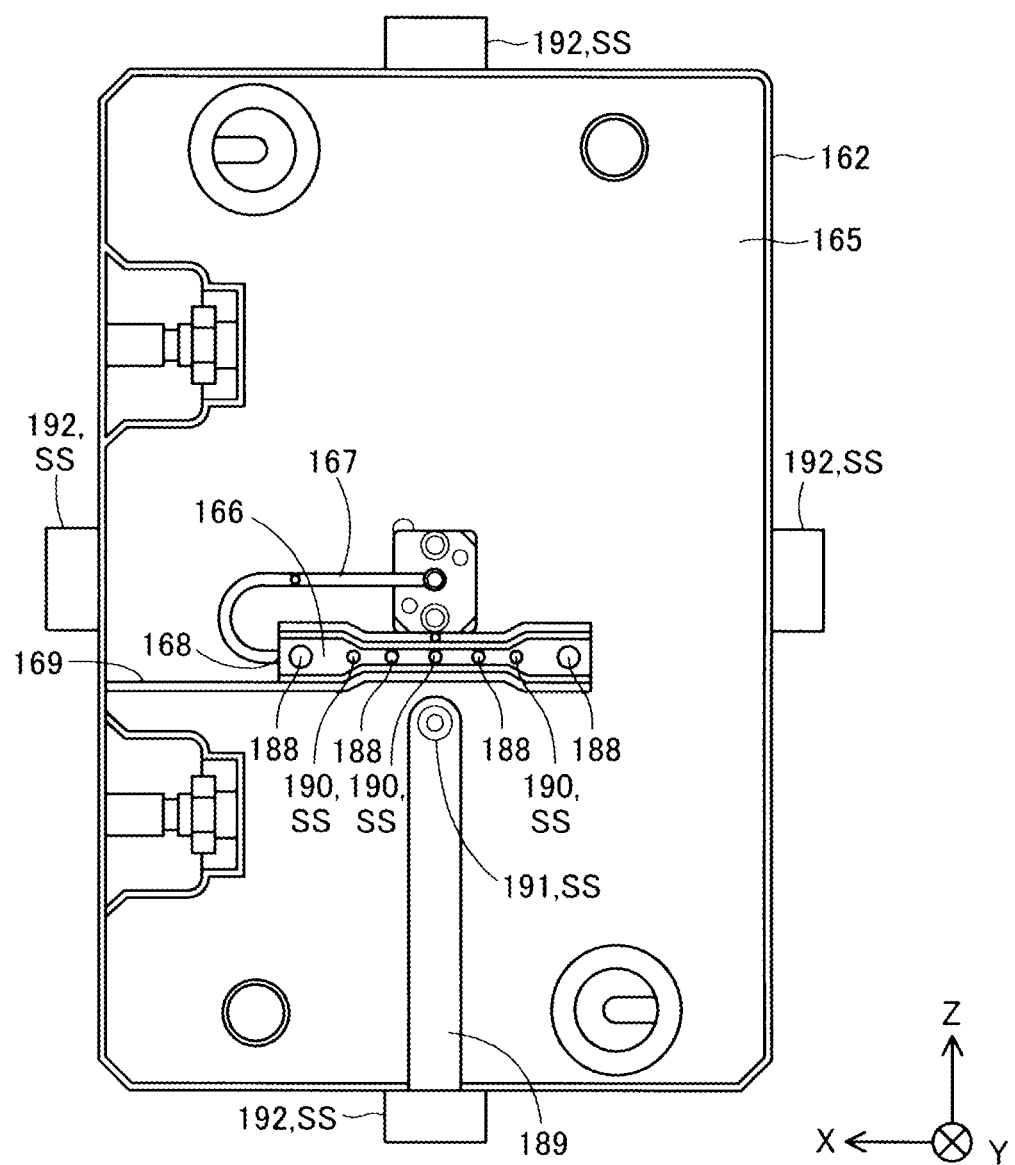
FIG. 5 is a plan view showing a fixed-mold-side end surface of a moving mold.

FIG. 5 is a plan view showing the end surface on the fixed mold 163 side of the moving mold 162. The end surface on the fixed mold 163 side of the moving mold 162 is referred to as a parting surface 165. On the parting surface 165, the cavity section 166 for molding a molded product having the shape of a dumbbell test specimen is formed. Also, a runner 167, a gate 168, and a gas vent 169 are formed on the parting surface 165 in such a way as to communicate with the cavity section 166. In the cavity section 166 and the runner 167, a plurality of penetration holes 188 to insert the ejector pin 181 are formed.

In an inner wall surface of the cavity section 166, a temperature pressure sensor 190 that can measure both the temperature and pressure of the molten material injected from the injection molding device 10 into the cavity section 166 is embedded. In this embodiment, three temperature pressure sensors 190 are embedded so as to measure the temperature and pressure at three positions in the cavity section 166. Each temperature pressure sensor 190 has a quartz element for measuring the pressure and a thermocouple for measuring the temperature. Also, in the moving mold 162, a mold temperature sensor 191 for measuring the temperature of the mold near the cavity section 166 is arranged in a hole section 189 formed inward from the lateral surface of the moving mold 162. Moreover, the moving mold 162 in this embodiment has a position sensor 192 at a substantially central part on each side of an outer circumferential part thereof. The position sensor 192 is a contactless displacement sensor and detects the position of the moving mold 162 in relation to the fixed mold 163. As the position sensor 192, a sensor of various types such as optical type and eddy current type can be used. The position sensor 192 may be attached at any position and any number of position sensors 192 may be used. In the description below, the temperature pressure sensor 190, the mold temperature sensor 191, and the position sensor 192 are collectively referred to as a sensor SS. Also, in the description below, the temperature, pressure, and position measured by the sensor SS are referred to as a sensor value.

Figure 6:
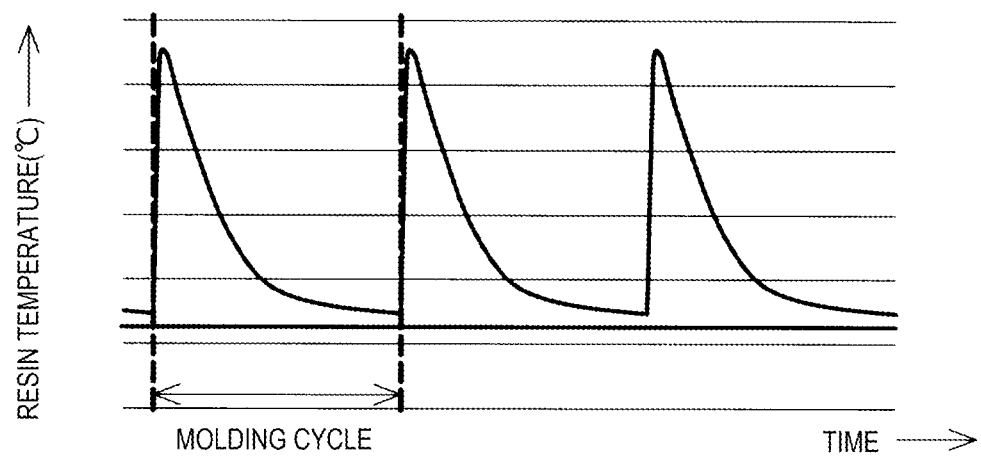
FIG. 6 shows a change in the sensor value of resin temperature.
Figure 7:
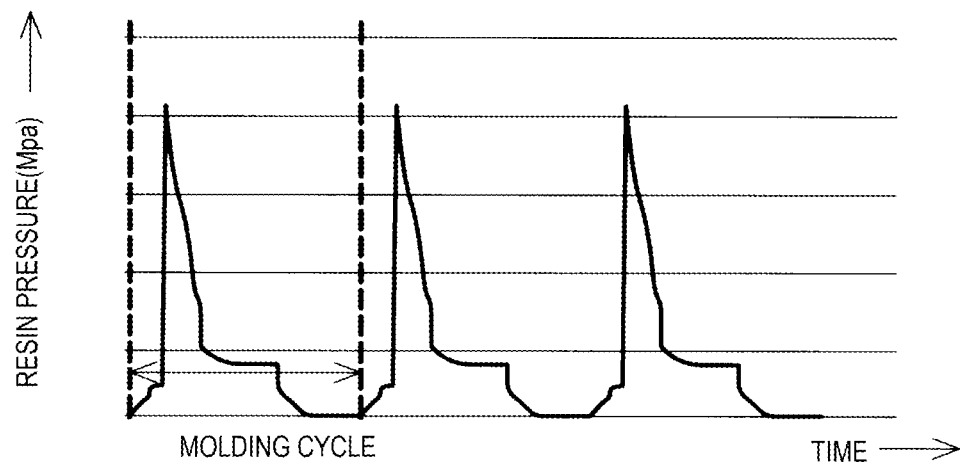
FIG. 7 shows a change in the sensor value of resin pressure.

FIG. 6 shows a change in the sensor value of the resin temperature detected by the sensor SS. FIG. 7 shows a change in the sensor value of the resin pressure detected by the sensor SS. As shown in FIGS. 6 and 7, the sensor value of the resin temperature and the sensor value of the resin pressure in the cavity section 166 change periodically every molding cycle. Generally, these sensor values peak immediately after the start of molding. Subsequently, as the mold is opened and the molded product is released, both the temperature and pressure drop. The sensor value acquired by the sensor SS is stored in time series in the control device 500.

Figure 8:
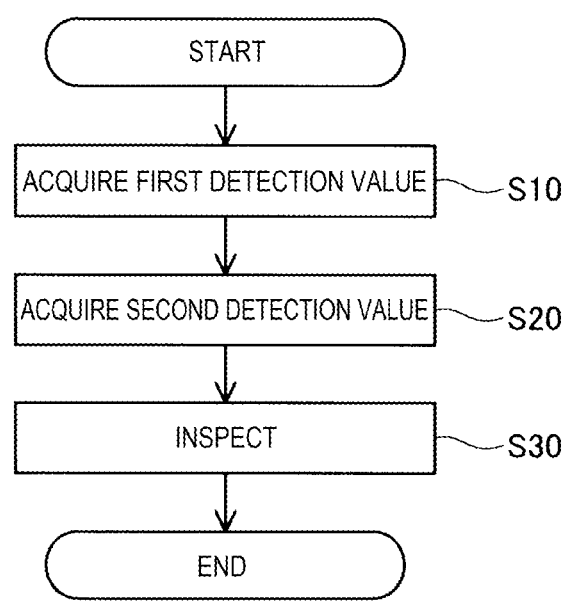
FIG. 8 is a flowchart of inspection processing.

FIG. 8 is a flowchart of inspection processing executed in the inspection system 20. The inspection processing is processing to implement an inspection method for the injection molding device 10 and is executed, for example, in the maintenance of the injection molding device 10. The maintenance is executed every predetermined period, for example, every 200 hours, every six months, or every year.

First, in a first step S10, the receiving unit 710 of the server 700 acquires the first detection value measured by the sensor SS. In this embodiment, the server 700 acquires time-series data of the sensor value measured using the test mold 160 when manufacturing the injection molding device 10. The time-series data is data resulting from continuously acquiring the sensor value for a predetermined period. In this embodiment, time-series data resulting from acquiring the sensor value during one molding cycle is acquired as the first detection value. The first detection value, for example, is measured when manufacturing or installing the injection molding device 10 and stored in the control device 500. The server 700 acquires the first detection value from the control device 500 via the terminal device 600. The first detection value may be stored in the terminal device 600 or the server 700 instead of the control device 500.

In a second step S20, the receiving unit 710 of the server 700 acquires the second detection value measured by the sensor SS from the terminal device 600. More specifically, first, the worker installs the test mold 160 in the injection molding device 10 that has been used over years. Then, the control device 500 controls the injection molding device 10 to actually perform injection molding, and transmits the time-series data of the sensor value acquired using the sensor SS of the test mold 160 to the server 700 as the second detection value. Thus, the server 700 acquires the second detection value.

In a third step S30, the inspection unit 720 of the server 700 inspects the injection molding device 10, using the first detection value and the second detection value acquired in the first step S10 and the second step S20. In this embodiment, a change in the state of the injection molding device 10 is inspected by comparing the first detection value and the second detection value. More specifically, the inspection unit 720 calculates the amount of drop in the peak value in the time-series data of each of the resin temperature and the resin pressure, based on the first detection value and the second detection value, and determines the degree of deterioration with time of the injection molding device 10 as the change in the state, using the amount of drop. The output unit 730 transmits the result of the determination to the terminal device 600. The terminal device 600 displays, on a display device, the result of the determination received from the server 700, and thus notifies the worker of the degree of deterioration of the injection molding device 10.

In addition to or instead of determining the degree of deterioration, the server 700 may determine that an abnormality has occurred, when the difference between the peak value of the first detection value and the peak value of the second detection value exceeds a predetermined threshold. For example, when the difference between the peak values of temperature exceeds a threshold, the server 700 can determine that an abnormality has occurred in the plasticizing unit 100. When the difference between the peak values of pressure exceeds a threshold, the server 700 can determine that an abnormality has occurred in the plasticizing unit 100 or the mold clamping device 170. Also, when the difference between the peak values of the distance from the moving mold 162 to the fixed mold 163 exceeds a threshold, the server 700 can determine that an abnormality has occurred in the mold clamping device 170. The comparison with each threshold may be carried out using a representative value such as the average value or median of the time-series data, instead of the peak value of the time-series data.

In the inspection system 20 according to this embodiment as described above, the injection molding device 10 is inspected, using the first detection value measured when manufacturing the injection molding device 10 and the second detection value measured after the injection molding device 10 is used over years. Therefore, the injection molding device 10 can be inspected more accurately. More specifically, using the first detection value and the second detection value, a change in the state of the injection molding device 10 with the lapse of time and the presence or absence of an abnormality can be inspected. Particularly, the first detection value and the second detection value are directly measured values of the temperature and pressure of the resin inside the cavity section 166 formed in the test mold 160. Therefore, the injection molding device 10 can be inspected more accurately, using these values. Also, in this embodiment, the first detection value and the second detection value are time-series data resulting from acquiring the output from the sensor SS for a predetermined period. Therefore, the injection molding device 10 can be inspected more accurately, based on the change in the sensor value due to the molding operation of the injection molding device 10.

B. Second Embodiment

Figure 9:
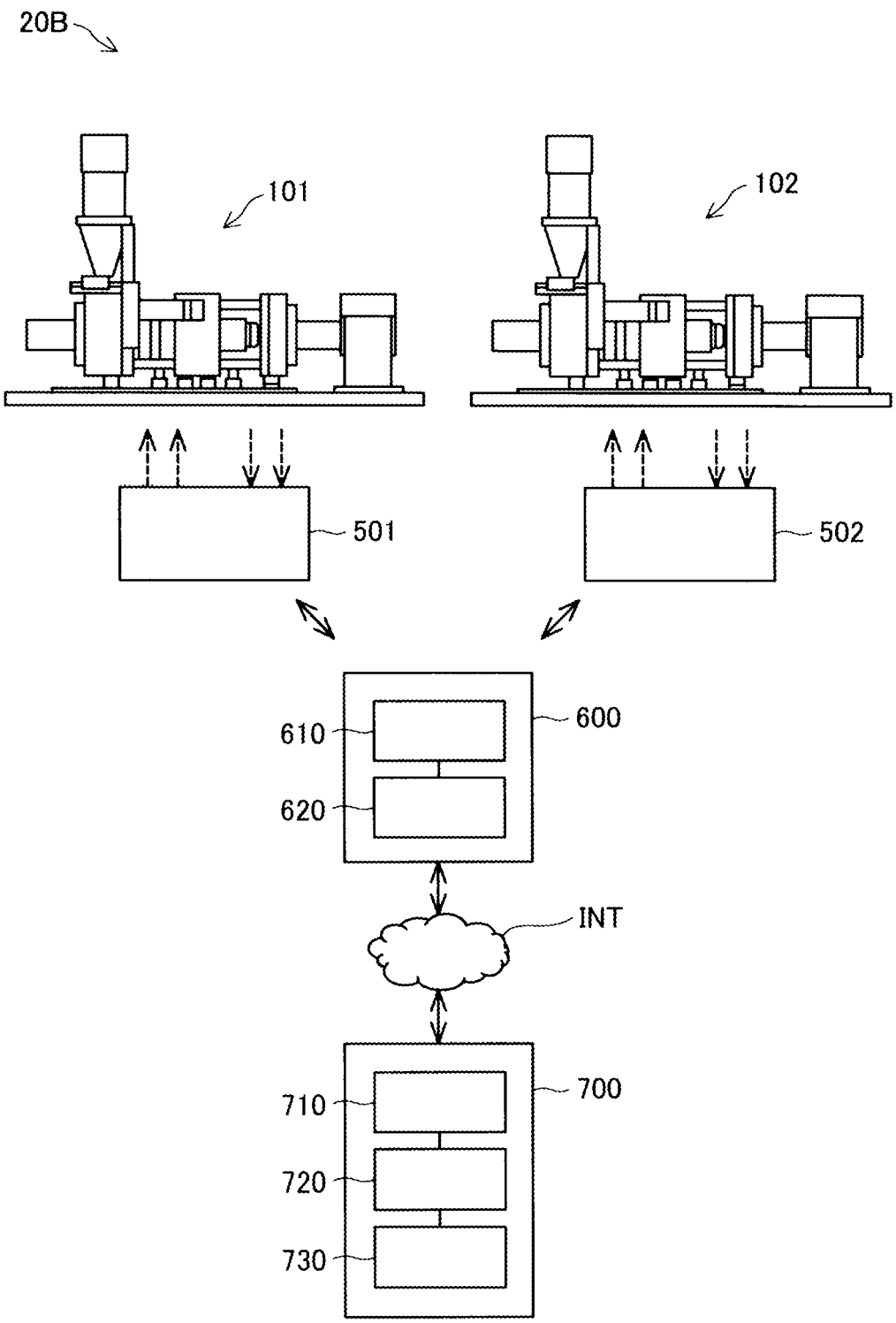
FIG. 9 shows a schematic configuration of an inspection system according to a second embodiment.

FIG. 9 shows a schematic configuration of an inspection system. 20B according to a second embodiment. The inspection system 20B according to the second embodiment includes a first injection molding device 101 and a second injection molding device 102. The first injection molding device 101 and the second injection molding device 102 are different devices having an identical configuration. The first injection molding device 101 is controlled by a control device 501. The second injection molding device 102 is controlled by a control device 502.

In the inspection processing in this embodiment, in the first step S10 shown in FIG. 8, the server 700 acquires the first detection value acquired using the sensor SS of the test mold 160 installed in the first injection molding device 101, via the terminal device 600 and the control device 501. In the second step S20, the server 700 acquires the second detection value acquired using the sensor SS of the test mold 160 installed in the second injection molding device 102, via the terminal device 600 and the control device 502. In the third step S30, the server 700 executes an inspection using the first detection value and the second detection value acquired in the first step S10 and the second step S20. In this embodiment, the server 700 inspects a variation in the state of the first injection molding device 101 and the second injection molding device 102, using the first detection value and the second detection value. The "state" includes various parameters such as the temperature of the resin, the pressure of the resin, the position of the moving mold, and the degree of change with time. The "variation" includes values such as the degree of coincidence, the degree of discrepancy, the difference or the like of these parameters.

In the inspection system 20B according to the second embodiment as described above, the first detection value and the second detection value are acquired from the different injection molding devices 101, 102. Therefore, the variation in the state of the first injection molding device 101 and the second injection molding device 102 can be inspected by comparing these detection values. While two injection molding devices are shown in FIG. 9, the number of injection molding devices may be three or more. By acquiring detection values from many injection molding devices, a statistical variation in the state of each injection molding device can be inspected accurately. While only one terminal device 600 is shown in FIG. 9, the terminal device 600 may be prepared every injection molding device.

C. Third Embodiment

Figure 10:
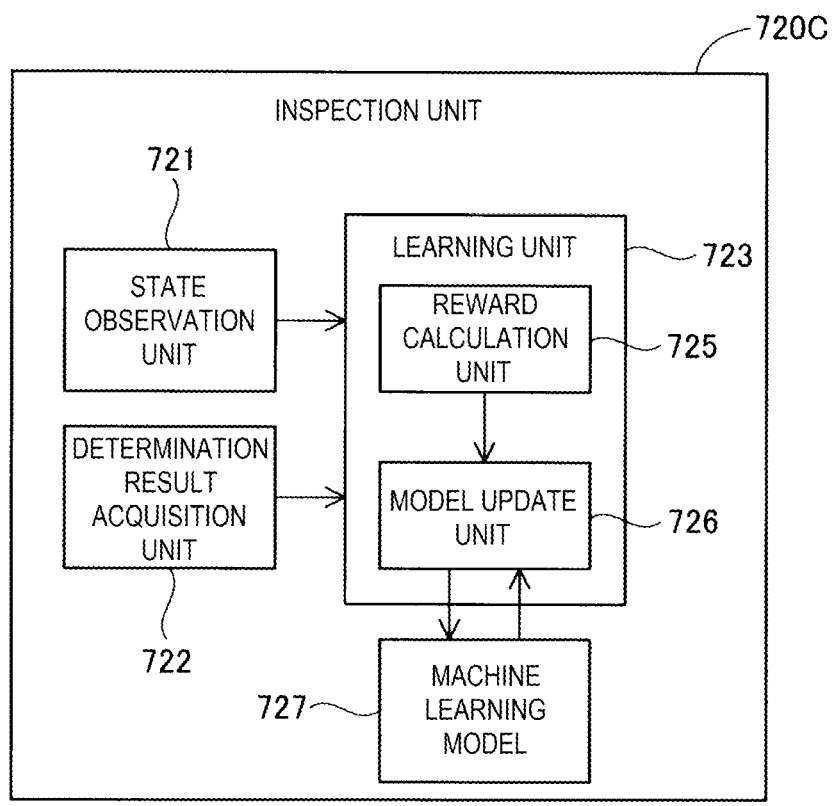
FIG. 10 is a functional block diagram of an inspection unit in a server according to a third embodiment.

FIG. 10 is a functional block diagram of an inspection unit 720C of the server 700 according to a third embodiment. In the third embodiment, in the third step S30 shown in FIG. 8, the server 700 performs an inspection of the injection molding device 10, using a machine learning model in which a correlation between the first detection value and the second detection value, and an abnormality in the injection molding device 10, is machine-learned.

The inspection unit 720C has, as its functional blocks, a state observation unit 721, a determination result acquisition unit 722, and a learning unit 723. The learning unit 723 has a reward calculation unit 725 and a model update unit 726. These functional blocks are implemented in the form of software by the CPU provided in the server 700 executing a program stored in the memory.

The inspection unit 720C determines an abnormality state of the injection molding device 10, using a machine learning model 727 and based on the first detection value and the second detection value acquired by the state observation unit 721. The inspection unit 720C transmits the result of the determination to the terminal device 600. The terminal device 600 presents the result of the determination to the worker, using the display device. The "inspection" in this embodiment refers to that the inspection unit 720C determines an abnormality state of the injection molding device 10, using the machine learning model 727.

The state observation unit 721 acquires the first detection value and the second detection value as state variables from the terminal device 600 and observes these values.

The determination result acquisition unit 722 acquires, from the terminal device 600, determination data representing whether or not the worker has accepted the result of the determination showing an abnormality presented to the worker via the terminal device 600. For example, when the result of the inspection showing an abnormality presented by the terminal device 600 coincides with the actual abnormal state, the worker carries out an operation indicating that the worker accepts the result of the inspection, to the terminal device 600. Meanwhile, when the result of the inspection showing an abnormality presented by the terminal device 600 does not coincide with the actual abnormal state, the worker carries out an operation indicating that the worker does not accept the result of the inspection, to the terminal device 600. The terminal device 600 generates determination data in response to the operation carried out by the worker and transmits the determination data to the determination result acquisition unit 722 of the server 700.

The learning unit 723 learns the correlation between the first detection value and the second detection value, and the abnormal state of the injection molding device 10, using the first detection value and the second detection value observed by the state observation unit 721 and the determination data acquired by the determination result acquisition unit 722. The learning unit 723 updates the machine learning model 727, based on the result of the learning. The machine learning model 727 is expressed, for example, by a value function described later. The "abnormal state" of the injection molding device 10 includes various abnormal states that can occur in the injection molding device 10, such as wear of the gear provided in the mold clamping device 170, leakage of the resin from the plunger 152, heating failure of the heating unit 148, and rotation failure of the rotor 130.

The learning algorithm executed by the learning unit 723 is not particularly limited. For example, a known learning algorithm for machine learning such as supervised learning, unsupervised learning, reinforcement learning, or neural network can be employed. The learning unit 723 shown in FIG. 10 executes reinforcement learning as an example of the learning algorithm. Reinforcement learning is a technique in which a cycle of observing the current state of the environment where a learning target exists, executing a predetermined action in the current state, and giving a certain reward for the action is repeated in the form of trial and error, so as to learn a measure that maximizes the total of the rewards, as an optimal solution.

An example of the reinforcement learning algorithm executed by the learning unit 723 will now be described. The algorithm in this example is known as Q-learning. Q-learning is a technique in which, using a state s of an agent and an action a that can be selected by the agent in the state s as independent variables, a function Q (s, a) expressing the value of the action as of when the action a is selected in the state s is learned. Selecting an action a that maximizes the value function Q in the state s is the optimal solution. Q-learning is started in the state where the correlation between a state s and an action a is unknown, and trial and error of selecting various actions a in an arbitrary state s is repeated. Thus, the value function Q is repeatedly updated to be closer to the optimal solution. Here, the algorithm is configured in such a way that when the environment, that is, the state s has changed as the result of selecting the action a in the state s, a reward r, that is, a weighting of the action a corresponding to the change is provided, so that the learning is guided to select an action a that gains a higher reward r. Thus, the value function Q can become closer to the optimal solution in a relatively short time.

The updating formula of the value function Q can generally be expressed by the following formula (1):

$$Q(s_{t+1}, a_{t+1}) \leftarrow Q(s_t, a_t) + \alpha(r_{t+1} + \gamma \max Q(s_{t+1}, a) - Q(s_t, a_t)) \quad (1).$$

In the formula (1), $s_t$ and $a_t$ are the state and action at the time t. In response to the action $a_t$, the state changes to $s_{t+1}$. $r_{t+1}$ is the reward gained by the change in the state from $s_t$ to $s_{t+1}$. The term of maxQ means Q as of when the action a that achieves the maximum value Q at the time t+1 is carried out. $\alpha$ and $\gamma$ are the learning rate and the discount factor, respectively, and are arbitrarily set within the range of $0<\alpha\le1$ and $0<\gamma\le1$.

When the learning unit 723 executes Q-learning, a state variable S observed by the state observation unit 721 and determination data Dj acquired by the determination result acquisition unit 722 are equivalent to the states s in the updating formula. An action corresponding to an abnormal state of the injection molding device 10 according to the first detection value and the second detection value is equivalent to the action a in the updating formula. A reward R calculated by the reward calculation unit 725 is equivalent to the reward r in the updating formula. Thus, the model update unit 726 repeatedly updates the function Q representing the current abnormal state of the injection molding device 10, by Q-learning using the reward R. The reward R calculated by the reward calculation unit can be, for example, a positive reward R when the worker accepts the result of determination about the abnormal state determined using the value function Q, and a negative reward R when the worker does not accept the result of determination.

Figure 11:
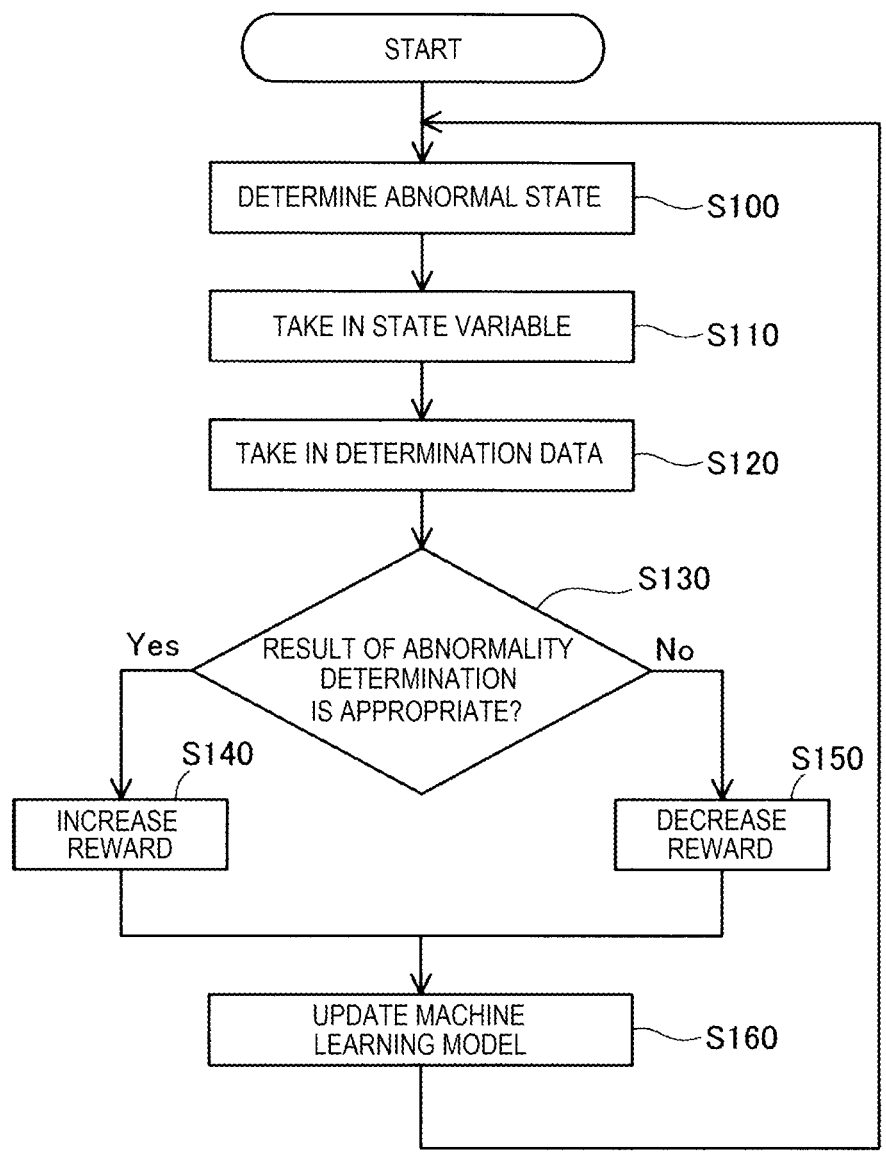
FIG. 11 is a flowchart of Q-learning executed by the inspection unit.

FIG. 11 is a flowchart of Q-learning executed by the inspection unit 720C. First, in step S100, the inspection unit 720C determines an abnormal state corresponding to the current state indicated by the state variable S observed by the state observation unit 721, while referring to the machine learning model 727 at the time. Next, in step S110, the learning unit 723 takes in the state variable S of the current state observed by the state observation unit 721. In step S120, the learning unit 723 takes in the determination data Dj of the current state acquired by the determination result acquisition unit 722. Next, in step S130, the learning unit 723 determines whether the abnormal state determined in step S100 is appropriate or not, based on the determination data Dj. When the abnormal state is appropriate, the learning unit 723 in step S140 applies the positive reward R calculated by the reward calculation unit 725 to the updating formula of the function Q. Then, in step S160, the learning unit 723 updates the machine learning model 727, using the state variable S corresponding to the current state, the determination data Dj, the reward R, and the value of the action value. When the abnormal state is determined as not appropriate in step S130, the learning unit 723 in step S150 applies the negative reward R calculated by the reward calculation unit 725 to the updating formula of the function Q. Then, in step S160, the learning unit 723 updates the machine learning model 727, using the state variable S corresponding to the current state, the determination data Dj, the reward R, and the value of the action value. The inspection unit 720C repeats steps S100 to S160, thus repeatedly updates the machine learning model 727, and advances the learning of abnormal determination.

According to the third embodiment as described above, an abnormal state of the injection molding device 10 can be determined, based on the first detection value, the second detection value, and the result of machine learning. Therefore, the injection molding device 10 can be inspected accurately. In this embodiment, an abnormal state of the injection molding device 10 is learned and determined. However, for example, a cause of an abnormality or an abnormal site in the injection molding device 10 may also be learned and determined.

Figure 12:
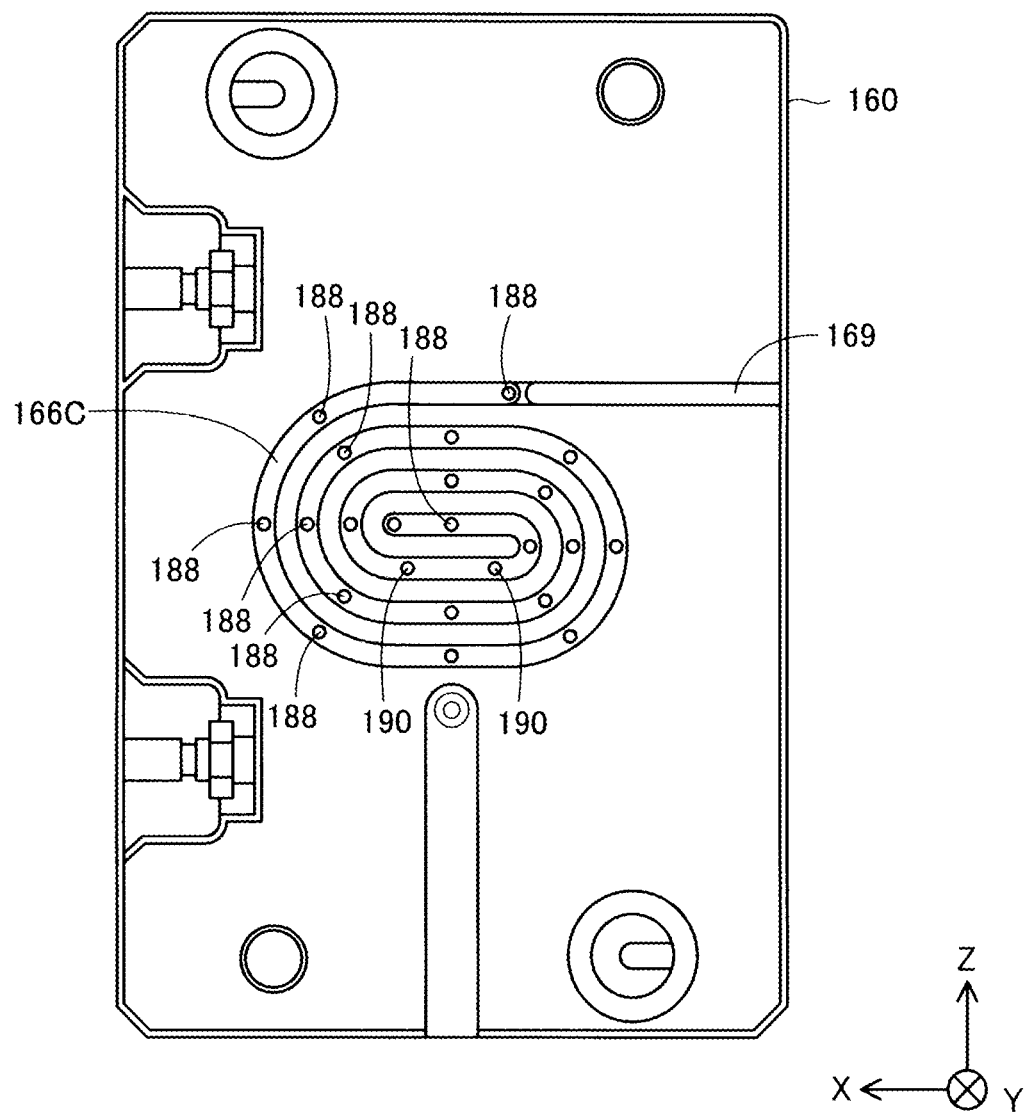
FIG. 12 is a plan view showing another example of the moving mold.

D. Other Embodiments (D-1) In the foregoing embodiments, the test mold 160 has the cavity section 166 having the shape of a dumbbell test specimen, as shown in FIG. 5. However, the test mold 160 may have a cavity section 166C having a swirl-like shape, as shown in FIG. 12. Using the test mold 160 having the cavity section 166C of such a shape, the fluidity of the molten material can be evaluated.

(D-2) In the foregoing embodiments, time-series data is used as the first detection value and the second detection value. However, a sensor value at a predetermined timing during the molding cycle and a sensor value at the startup or termination of the injection molding device 10 may be used as the first detection value and the second detection value.

(D-3) In the foregoing embodiments, the test mold 160 has the mold temperature sensor 191 and the position sensor 192. However, the test mold 160 may not have these sensors. The test mold 160 may have a sensor measuring only the temperature of the resin or only the pressure of the resin, instead of the temperature pressure sensor 190.

(D-4) In the foregoing embodiments, the server 700 performs the inspection of the injection molding device 10. However, the injection molding device 10 itself, the control device 500, or the terminal device 600, instead of the server 700, may perform the inspection of the injection molding device 10.

(D-5) In the foregoing embodiments, an example where the cavity section 166 is formed on the moving mold 162 side is described. However, the cavity section 166 may be formed on the fixed mold 163 side.

(D-6) In the foregoing embodiments, the plasticizing unit 100 provided in the injection molding device 10 plasticizes the material, using the rotor 130 having the groove part 135 provided on the end surface. However, the plasticizing unit 100 may plasticize the material, using a spiral in-line screw accommodated in a cylindrical barrel.

E. Other Aspects

The disclosure is not limited to the foregoing embodiments and can be implemented with various other configurations without departing from the spirit and scope of the disclosure. For example, a technical feature in the embodiments corresponding to a technical feature in each of the aspects given below can be suitably replaced or combined with another in order to solve a part or all of the foregoing problems or in order to achieve a part or all of the foregoing effects. The technical feature can be suitably deleted unless described as essential in this specification.

(1) According to a first aspect of the disclosure, an inspection method for an injection molding device is provided. The inspection method includes: a first step of acquiring a first detection value from a sensor using a test mold having the sensor, the sensor measuring a temperature or pressure of a molten material injected from a first injection molding device into a cavity section demarcated by a fixed mold and a moving mold; a second step of injecting a molten material from a second injection molding device into the cavity section and acquiring a second detection value from the sensor; and a third step of performing an inspection using the first detection value and the second detection value.

The inspection method according to this aspect uses the first detection value and the second detection value and therefore can accurately inspect the injection molding device.

(2) In the above aspect, the second injection molding device may be a device that is the first injection molding device used over years. In the third step, a change in state with time of the first injection molding device may be inspected.

(3) In the above aspect, the first injection molding device and the second injection molding device may be different devices. In the third step, a variation in state of the first injection molding device and the second injection molding device may be inspected.

(4) In the above aspect, in the third step, an abnormality in the second injection molding device may be inspected.

(5) In the above aspect, in the third step, the inspection may be performed using a machine learning model in which a correlation between the first detection value and the second detection value, and the abnormality, is learned. According to this aspect, an abnormality in the injection molding device can be inspected more accurately.

(6) In the above aspect, the first detection value and the second detection value may be time-series data resulting from acquiring an output from the sensor for a predetermined period. According to this aspect, the injection molding device can be inspected more accurately, based on a change in the output from the sensor due to the molding operation of the injection molding device.

(7) In the above aspect, the test mold may have a sensor measuring a position of the moving mold. According to this aspect, the injection molding device can be inspected using the position of the moving mold.

(8) In the above aspect, the first injection molding device and the second injection molding device may have a plasticizing unit, the plasticizing unit including a rotor having a groove formed on an end surface, a barrel arranged facing the end surface and having a communication hole formed therein, and a heating unit.

(9) According to a second aspect of the disclosure, a test mold installed in an injection molding device is provided. The test mold includes: a fixed mold; a moving mold; a cavity section demarcated by the fixed mold and the moving mold; and a sensor measuring a temperature or pressure of a molten material injected from the injection molding device into the cavity section.

(10) According to a third aspect of the disclosure, an inspection system for an injection molding device is provided. The inspection system includes: a test mold having a fixed mold, a moving mold, a cavity section demarcated by the fixed mold and the moving mold, and a sensor measuring a temperature or pressure of a molten material injected from the injection molding device into the cavity section, the test mold being installed in the injection molding device; a terminal device having an acquisition unit that acquires a detection value from the sensor and a transmission unit that transmits the detection value; and a server having a receiving unit that receives the detection value transmitted from the transmission unit, an inspection unit that performs an inspection of the injection molding device using the detection value, and an output unit that outputs a result of the inspection.

What is claimed is:

1. An inspection method, comprising:
    acquiring a first detection value from a sensor installed in a test mold, the sensor measuring a temperature or pressure of a first molten material injected from a first injection molding device into a cavity section of the test mold, wherein
        the cavity section is demarcated by a fixed mold and a moving mold of the test mold,
        the first detection value indicates first time-series data that results from acquiring an output from the sensor for a first predetermined period, and
        the test mold is removably installed in the first injection molding device at a first time for the acquisition of the first detection value;
    controlling a second injection molding device to perform an injection molding process to inject a second molten material from the second injection molding device into the cavity section of the test mold;
    acquiring a second detection value from the sensor during the injection molding process, wherein
        the test mold is removably installed in the second injection molding device at a second time for the acquisition of the second detection value, and
        the second detection value indicates second time-series data that results from acquiring the output from the sensor for a second predetermined period;
    determining whether a difference between a first value of the first time-series data and a second value of the second time-series data exceeds a threshold, wherein
    the first value includes one of a peak value, an average value, or a median of the first time-series data, and
    the second value includes one of a peak value, an average value, or a median of the second time-series data;
    detecting an abnormality in the second injection molding device based on the determination that the difference exceeds the threshold, in a case where the second injection molding device corresponds to a device used over time; and
    detecting, based on a comparison between the first detection value of the first molding device and the second detection value of the second injection molding device, a variation in a state of the first injection molding device and the second injection molding device, in a case where the second injection molding device is a different device from the first injection molding device and a configuration of the second injection molding device is same as a configuration of the first injection molding device.

2. The inspection method according to claim 1, wherein the second injection molding device includes a device that is the first injection molding device used over years, and
    a change in the state with time of the first injection molding device is inspected.

3. The inspection method according to claim 1, wherein the inspection method is performed using a machine learning model in which a correlation between the first detection value and the second detection value, and the abnormality, is learned.

4. The inspection method according to claim 1, wherein the first injection molding device and the second injection molding device have a plasticizing unit having:
    a rotor having a groove formed on an end surface;
    a barrel arranged facing the end surface and having a communication hole formed therein; and
    a heating unit.

5. The inspection method according to claim 1, wherein the test mold includes a mold that is not used for one of mass production or trial production of a molded product.

6. The inspection method according to claim 1, wherein the first injection molding device includes a mold clamping device,
    the first detection value and the second detection value include peak values of a distance from the moving mold to the fixed mold, and
    the inspection method further comprising determining that the abnormality has occurred in the mold clamping device in a case where a difference between the peak values of the distance from the moving mold to the fixed mold exceeds a specific threshold.

7. The inspection method according to claim 1, wherein the sensor is embedded in an inner wall surface of the cavity section at a position different from a position of an ejector pin in the cavity section.

8. An inspection method, comprising:
acquiring a first detection value from a sensor installed in a test mold, the sensor measuring a temperature or pressure of a first molten material injected from a first injection molding device into a cavity section of the test mold, wherein
  the cavity section is demarcated by a fixed mold and a moving mold of the test mold,
  the first detection value indicates first time-series data that results from acquiring an output from the sensor for a first predetermined period, and
  the test mold is removably installed in the first injection molding device at a first time for the acquisition of the first detection value;
controlling a second injection molding device to perform an injection molding process to inject a second molten material from the second injection molding device into the cavity section of the test mold;
acquiring a second detection value from the sensor during the injection molding process, wherein
  the test mold is removably installed in the second injection molding device at a second time for the acquisition of the second detection value, and
  the second detection value indicates second time-series data that results from acquiring the output from the sensor for a second predetermined period;
detecting, by a machine learning model, an abnormality in the second injection molding device based on the first detection value and the second detection value, in a case where the second injection molding device corresponds to the first injection molding device used over time, wherein the machine learning model is trained on a correlation between first detection value and the second detection value, and the abnormality in the second injection molding device based on determination data, wherein
the determination data indicates whether the detected abnormality has been accepted by a user of the second injection molding device; and
detecting, based on a comparison between the first detection value of the first molding device and the second detection value of the second injection molding device, a variation in a state of the first injection molding device and the second injection molding device, in a case where the second injection molding device is a different device from the first injection molding device and a configuration of the second injection molding device is same as a configuration of the first injection molding device.

* * * * *